Sept. 4, 1928.  
J. DE LA CIERVA  
1,682,893  
AIRCRAFT WITH ROTATIVE WINGS  
Filed Jan. 19, 1927
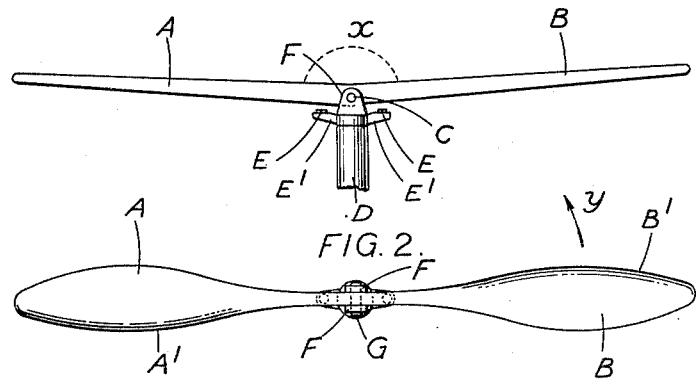
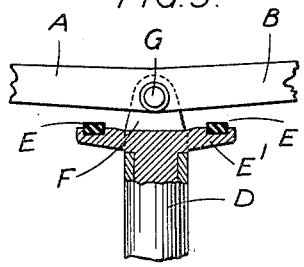
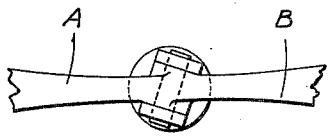
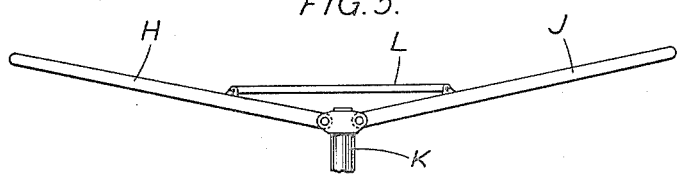
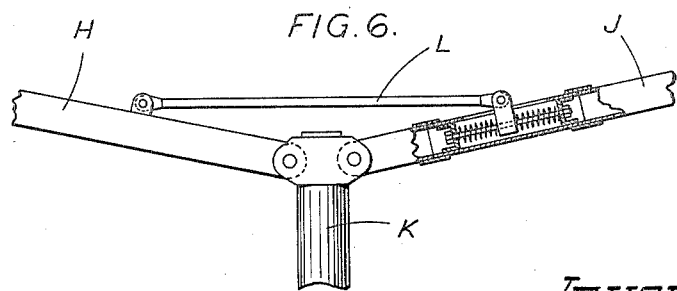
Inventor.
J. de la Cierva
by
Attys.

Patented Sept. 4, 1928.

1,682,893

UNITED STATES PATENT OFFICE.

JUAN DE LA CIERVA, OF MADRID, SPAIN.

AIRCRAFT WITH ROTATIVE WINGS.

Application filed January 19, 1927, Serial No. 162,176, and in Great Britain January 25, 1926.

This invention relates to aircraft of the type embodying a wing system which rotates freely in flight by reason of the action of the air flow on the wings and in which the wings are hinge-jointed to a member constituting their common centre of rotation in such a manner that during flight each wing is tending to adopt at all times positions in which the centrifugal force due to rotation and the lift are in equilibrium.

If, however, the centrifugal component be too small the wings may incline upwards to such an extent that their aerodynamical efficiency is impaired. To overcome this, centrifugal force may be increased by making the wings heavier. It is obvious however that the general efficiency of the aircraft would be reduced by unduly increasing the weight of the wings.

It has been found from observation of the movement of the wings in flight (made possible by "slow motion" kinematographic records) that the angle between any two diametrically opposite wings pre-supposing an even number of wings) varies only to a limited extent in a complete revolution. The wing advancing into the air flow rises whilst that wing moving with the air flow descends, the angle between them remaining more or less constant.

According to the present invention, in a supporting aerofoil system of the character referred to, diametrically opposite wings are so connected or rendered interdependent that the vertical angle between them remains constant or approximately so during rotation.

This vertical angle will obviously vary according to the characteristics of the wings and the aircraft. Usually it will be approximately equal to the mean angle which diametrically opposite wings would form with one another in a complete revolution if the wings were perfectly free to swing independently about their hinge joints.

The invention may be applied in various constructional forms, as for instance by connecting oppositely disposed wings by means of a rigid or partially yieldable member.

A particularly advantageous form of construction however is one in which the supporting aerofoil system is constituted by a pair of wings disposed at a horizontal angle of 180° and rigidly interconnected as for example by constructing both wings on a common longitudinal spar or spars, the pair being centrally hinge-jointed to the rotative member connected to the body of the aircraft in such a manner that the said wings may rock as a unit about the axis of the hinge joint in response to variations of aerodynamical pressure.

This arrangement has the advantage of extreme simplicity of construction and reduction of weight and it will further be obvious that the centrifugal stresses, in the case where the pair of wings are constructed on a common longitudinal spar or spars, are taken by the latter and not by the hinge-joint bearings as in the case where each wing is independently hinge-jointed to the axis of rotation.

The ordinary separately hinged construction may be employed however with either a rigid or a yieldable connection between oppositely disposed wings, and in all cases the necessity is avoided of loading the wing tips or otherwise increasing the weight of the wing structure in order to maintain the requisite centrifugal component.

The accompanying drawings diagrammatically illustrate forms of construction in accordance with the present invention.

Figs. 1 and 2 are respectively an elevation and a plan view of one form in which a pair of wings are constructed as a unit.

Fig. 3 is a local view in elevation partly in section of the hinge-joint.

Fig. 4 in a local view in plan illustrating an alternative construction in which the axis of the hinge-joint is inclined as hereinafter described.

Fig. 5 is an elevation of another form of construction employing independent hinge-joints with a rigid wing connecting member, and Fig. 6 is a similar view on a larger scale illustrating a yieldable connexion.

Referring to Figs. 1, 2 and 3:—

A pair of wings A and B are constructed as a unit on a common longitudinal spar or spars with a suitable vertical angle $x$ between them, in the general case equal to the mean angle the wings would form in a complete revolution were they independently hinge-jointed. These wings are centrally hinged as a unit at C to a substantially vertical member D rotatably supported by the body of the aircraft, with any known or suitable form of mounting.

Resilient blocks or buffers E carried by arms E¹ are provided to prevent the wings inclining below a predetermined limit.

Since the wings are rotative, the sense of rotation being shown by the arrow y (Fig. 2), the leading edges A¹ and B¹ of the wings are reversed with respect to each other.

The hinge-joint is here shown as consisting of a pair of lugs F forming bearings, which may be ball or other anti-friction bearings, for a pin G passing through a strengthened central section of the wings.

It will be seen that with this form of construction the centrifugal stresses due to rotation are taken along the rigid wing spar or spars and not by the hinge bearings.

In the form illustrated in Fig. 4 the axis of the hinge-joint is inclined viewed in plan to the longitudinal axis of symmetry of the wings to effect an automatic variation of aerodynamical incidence as the wings rise and fall during rotation. The inclination is such that the wing advancing against the air flow decreases its incidence as it rises, whilst the wing moving with the air flow increases its incidence as it descends and in this manner the range of variation of incidence in a complete revolution is diminished, with a consequent increase of efficiency.

In Fig. 5 a pair of wings H and J are independently hinge-jointed to the rotative member K and are connected by a rigid strut L pivoted at its ends to the wings.

In the form shown in Fig. 6 the connexions of the strut L to the wings are spring mounted to allow the vertical angle between the wings to vary within suitable limits.

What I claim is:—

1. In aircraft, a supporting system comprising an even number of freely rotative wings adapted to be driven by the relative air flown across them in flight, diametrically opposite wings being connected or rendered interdependent and flexibly jointed to the axis of rotation in such a manner that each pair of wings may oscillate under the influence of centrifugal and lift forces in a plane substantially perpendicular to the plane of rotation.

2. In aircraft, a supporting system comprising an even number of freely rotative wings adapted to be driven by the relative air flow across them in flight, a rotative member connected to the body of aircraft and revolvable about a substantially vertical axis, flexible joints connecting the wings to said rotative member and yieldable elements connecting diametrically opposite wings in pairs in such a manner that each pair may oscillate under the influence of centrifugal and lift forces in a plane substantially perpendicular to the plane of rotation.

3. In aircraft, a freely rotative supporting system comprising a pair of wings diametrically oppositely disposed in the plane of rotation and rigidly connected together, a rotative member connected to the body of the aircraft and revolvable about a substantially vertical axis, and a hinge joint connecting the pair of wings to said rotative member so that said wings may rock as a unit about the axis of the joint under the influence of centrifugal and lift forces.

4. In aircraft, a freely rotative supporting system comprising a pair of wings diametrically oppositely disposed in the plane of rotation and adapted to be driven by the relative air flow across them in flight, both of said wings being constructed on a common longitudinal spar, a rotative member connected to the body of the aircraft and revolvable about a substantially vertical axis and a hinge joint connecting the pair of wings to said rotative member so that said wings may rock as a unit about the axis of the joint under the influence of centrifugal and lift forces.

5. In aircraft, a freely rotative supporting system comprising a pair of wings diametrically oppositely disposed in the plane of rotation and rigidly connected together, a rotative member connected to the body of the aircraft and revolvable about a substantially vertical axis, and a hinge joint connecting the pair of wings to said rotative member so that said wings may rock as a unit about the axis of the joint under the influence of centrifugal and lift forces, the axis of the hinge joint being inclined, viewed in plan to the longitudinal axis of symmetry of the wings in such a manner that during rotation the incidence of a rising wing decreases whilst that of a descending wing increases.

6. In aircraft, a freely rotative supporting system comprising a pair of wings diametrically oppositely disposed in the plane of rotation and adapted to be driven by the relative air flow across them in flight, both of said wings being constructed on a common longitudinal spar, a rotative member connected to the body of the aircraft and revolvable about a substantially vertical axis and a hinge joint connecting the pair of wings to said rotative member so that said wings may rock as a unit about the axis of the joint under the influence of centrifugal and lift forces the axis of the hinge joint being inclined, viewed in plan, to the longitudinal axis of symmetry of the wings in such a manner that during rotation the incidence of a rising wing decreases whilst that of a descending wing increases.

7. In aircraft, a supporting system comprising an even number of freely rotative wings adapted to be driven by the relative air flow across them in flight, diametrically opposite wings being connected or rendered interdependent and flexibly jointed to the axis of rotation in such a manner that each pair of wings may oscillate under the influence of centrifugal and lift forces in a plane substantially perpendicular to the plane of rotation, and limiting devices for preventing the wings swinging too low.

8. In aircraft, a supporting system comprising an even number of freely rotative wings adapted to be driven by the relative air flow across them in flight, a rotative member connected to the body of aircraft and revolvable about a substantially vertical axis, flexible joints connecting the wings to said rotative member and yieldable elements connecting diametrically opposite wings in pairs in such a manner that each pair may oscillate under the influence of centrifugal and lift forces in a plane substantially perpendicular to the plane of rotation and limiting devices for preventing the wings swinging too low.

JUAN de la CIERVA.